United States Patent [19]
Eckardt et al.

[11] Patent Number: 5,750,155
[45] Date of Patent: May 12, 1998

[54] DEVICE FOR THE INJECTION MOLDING OF PLASTIC OBJECTS ENCLOSING HOLLOW SPACES AND PROCESS FOR OPERATING IT

[75] Inventors: Helmut Eckardt, Meinerzhagen; Klaus Schröder, Marienheide; Jürgen Ehritt, Hilchenbach; Uwe Hübel, Lüdenscheid, all of Germany

[73] Assignee: Battenfeld GmbH, Meinerzhagen, Germany

[21] Appl. No.: 406,945

[22] PCT Filed: Sep. 25, 1993

[86] PCT No.: PCT/EP93/02608

§ 371 Date: May 5, 1995

§ 102(e) Date: May 5, 1995

[87] PCT Pub. No.: WO94/07675

PCT Pub. Date: Apr. 14, 1994

[30] Foreign Application Priority Data

Sep. 28, 1992 [DE] Germany ............... 42 29 168.2
Oct. 21, 1992 [DE] Germany ............... 42 35 526.5

[51] Int. Cl.⁶ .................................. B29C 45/23
[52] U.S. Cl. .............................. 425/130; 264/572
[58] Field of Search ........................ 264/572, 537, 264/539; 425/130, 535, 536

[56] References Cited

U.S. PATENT DOCUMENTS

| | | | |
|---|---|---|---|
| 2,175,053 | 10/1939 | Ferngren | 264/539 |
| 2,331,702 | 10/1943 | Kopitke | 264/537 |
| 3,268,641 | 8/1966 | King | 264/539 |
| 3,305,890 | 2/1967 | Senior et al. | 264/537 |
| 3,836,306 | 9/1974 | Grazine | 425/387.1 |
| 3,998,577 | 12/1976 | Farrell | 425/535 |
| 4,806,093 | 2/1989 | Linss et al. | 264/539 |
| 5,054,689 | 10/1991 | Hunerberg et al. | |
| 5,364,252 | 11/1994 | Hlavaty | 264/572 |
| 5,466,141 | 11/1995 | Eckardt et al. | 264/572 |

FOREIGN PATENT DOCUMENTS

| | | |
|---|---|---|
| 0390068 | 10/1990 | European Pat. Off. |
| 0435025 | 7/1991 | European Pat. Off. |
| 3936289 | 5/1991 | Germany |
| 9310955 | 6/1993 | WIPO |

Primary Examiner—Catherine Timm
Attorney, Agent, or Firm—Anderson Kill & Olick P.C.

[57] ABSTRACT

The proposal is for a device for injection molding plastic items enclosing hollow spaces with which a further pressurised medium like air, gas or a fluid can be introduced through a hollow needle (5) at a point differing from the nozzle into a mould (1), the mould hollow or cavity (4) of which can be filled with molten pastic through a nozzle. There is a needle core (9) which can be moved axially to a limited extent in the hollow needle (5) and it is possible via this needle core (9) to vary the cross-section of or open and close the aperture (16) of the hollow needle (6) opening into the mould hollow or cavity (4). The needle core (9) bears a thickened head or plate (10) in front of the end of the aperture in the hollow needle, the outside diameter of which corresponds at least approximately to the outside diameter of the hollow needle, so that it forms, with the aperture end (6) of the hollow needle (5), a radially directed splitting valve. In relation to the hollow needle (5), the needle core (9) is axially supported by spring means (23). It is important here that these spring means (23) continuously engage with the needle core (9) in the closing direction of the aperture of the splitting valve (16) and that the needle core (9) can be moved against the spring means (23) in the opening direction by a remote-controlled driving device (17, 18).

4 Claims, 3 Drawing Sheets

DEVICE FOR THE INJECTION MOLDING OF PLASTIC OBJECTS ENCLOSING HOLLOW SPACES AND PROCESS FOR OPERATING IT

The invention deals with a process for injection molding of objects from plastics material containing hollow spaces or cavities in a mold, whose mold hollow space or cavity has to be fed on the one hand plastics melt through a nozzle and on the other hand has to be supplied with an additional pressurized medium as for instance air, gas or also liquid through a hollow needle at a point different from that of the nozzle, wherein a needle core which is axially displaceable to a limited extent, is disposed in said hollow needle, by means of which needle core the discharge aperture of the hollow needle to the mold hollow space or cavity can be varied in its admission cross-section or can be opened and closed.

A device having this combination of characteristics is already part of the state of the art through the DE-OS 39 36 289. Compared to other known devices of similar construction, for instance, one according to the DE-OS 21 06 546 it is distinguished by the circumstance that blocking of the discharge mouth aperture of the hollow needle can be securely counteracted even if this mouth aperture penetrates only into a portion of the wall thickness of the object at the end of the injection process and in the course of the dwell pressure following thereon, thus, while being still surrounded by liquid plastics melt. According to the DE-OS 39 36 289 the mouth aperture of the hollow needle can namely be adjusted to be so small, that it indeed permits the escape of the pressurized medium into the mold hollow space or cavity, while not permitting penetration of liquid plastics melt into the mouth aperture, at least not if one is dealing herein with thermoplastic material.

In particular those injection molding devices according to DE-OS 39 36 289 have been found to be especially useful for practical application, where the needle core carries an enlarged head or dish upstream of the mouth or aperture region of the hollow needle, whose external diameter corresponds at least approximately to the external diameter of the hollow needle and in which the needle core is axially abutted or supported by spring means relative to the hollow needle; this so that the head or dish of the needle core forms a radially oriented splitting valve together with the mouth end of the hollow needle whose maximum mouth or discharge gap, for instance, less than 0.2 millimeters, is defined by the spring means support or abutment. According to the DE-OS 39 36 289 the mouth slit or gap of the splitting valve can become smaller counter to the spring means support, for instance when the pressure of the medium inside the plastics melt contained in the mold hollow space or cavity of the mold increases to a magnitude, which can overcome the actuating force of the spring means.

When injection molding objects from plastics material having relatively large dimensions, therefore also enclosing large cavities at predetermined wall thicknesses, it is not possible to introduce sufficiently large quantities of the pressurized medium into the mold hollow space or cavity of the mold through only one single hollow needle, because the maximally available admission cross section of the splitting valve of this hollow needle is insufficient for this purpose. Therefore, we are faced with the necessity of equipping molds for fabrication of voluminous plastics objects with a correspondingly large quantity of hollow needles discharging into the mold hollow space or cavity. This naturally increases the expense of the molds which have to be made available, because its own particular medium feed must be allocated to each hollow needle.

Another deficiency of the device for injection molding of objects from plastics material containing cavities, which has become known from the DE-OS 39 36 289, arises from the circumstance that in case of the occasionally occurring contamination of the splitting valve in the hollow needle, the exposure of same required for cleaning purposes has to be performed from the rear end, because there the needle core is fixed in a mounting abutted against the hollow needle, which consist of screwed on elements, namely a threaded portion, an adjustment nut and a lock nut which can only be handled directly from the rear end.

The minimum splitter gap, which is less than 0.2 millimeters, of the splitting valve at the end of the hollow needle projecting into the mold hollow space or cavity of the mold to all intents and purposes does not permit thorough cleaning without removing the needle core from the hollow needle.

The invention itself aims to dispose of deficiencies still existing in generic devices for injection molding of objects from plastics material containing cavities as well as in addition to this to improve and/or expand utilization possibilities of such devices. Therefore the invention is faced with the task of indicating refinement possibilities for a device for injection molding of objects from plastics material containing cavities, which not only assure the optimum opening and closing of the admission cross-section of the splitting valve of the hollow needle, rather over and above this also permit if need be the exposure of large mouth-or discharge-gaps or-slits. In addition, any cleaning operations becoming necessary in the region of the splitting valve of the hollow needle are to be facilitated. Finally it is also attempted, to lay out the device for injection molding of objects from plastics material containing cavities in such a way, that said device can be also utilized without any problems, if a thermosetting plastics or elastomeric plastics material is introduced as a material into the mold hollow space or cavity of the mold.

A generic device for injection molding of objects from plastics material containing cavities, by means of which the complex problem demonstrated above can be solved, is distinguished in the invention basically by the spring means continuously engaging at the needle core in the closing sense of the mouth aperture and that the needle core is displaceable in the opening sense against the spring means.

An externally controlled power drive can actuate the needle core in the opening sense against the force of the spring means. The possibility however also exists of opening the needle core counter to the force of the spring means by the pressurized medium itself. In this case however a targeted pressure relief prior to opening the injection mold is not possible. The pressure relief occurs in this case by pressure escaping from the mold hollow space or cavity when the mold is opened. If a generic device is used which operates with a hollow needle disposed so as to be axially displaceable towards the mold hollow space or cavity of the mold, then the pressure relief can occur by the sudden exposure of the gas supply aperture when the hollow needle is moved backward.

Although actuation of the needle core in the opening sense by an externally controlled power drive is preferred, it is also easily possible to utilize the pressurized medium itself, thus the air, the gas or also the liquid, in order to displace the needle core in the opening sense counter to the effect of the springs means. In such a case it is advisable to provide the front region of the needle sleeve protruding into the melt with a cone-shaped widening or enlargement, because it can be achieved thereby, that the pressure decay does not occur abruptly when the mold is opened, rather gradually through the gap or slit becoming larger.

While the smallest possible aperture of the splitting valve, which can for instance amount to between 0 and 0.2 millimeters, is always determined by the spring means acting in the closing sense, all the larger opening widths of the mouth aperture or the splitting valve can be established securely and without any problems whatsoever by the externally actuated power drive.

Thus, it is possible in the invention to provide an electromagnet with a tappet directed against the rear end of the needle core by way of an externally controlled power drive, and indeed for instances in such a way, that said tappet sits in axial extension downstream of the hollow needle or the needle core of the mold half of the mold containing the device.

A piston-cylinder unit, to which a pressure medium can be supplied, can also be used as an externally controlled power drive for the needle core, with said piston cylinder unit engaging at the rear end of the needle core. Herein it is advantageous, if the needle core is inserted with its rear end into a piston which is received in a cylinder bore so as to be axially displaceable to a limited extent, if the spring means are clamped between the rear side of the piston and an end flange of the hollow needle, as well as concentrically surrounding the needle core, and if the feed point for the pressurized medium is allocated to the installation area of the spring means. In the last mentioned case, the entire device can be completely and easily housed inside a mold half of the mold.

If the device for injection molding objects from plastics material containing cavities has a structure where a head or dish of the needle core forms a splitting valve with the mouth end of the hollow needle, then it is advantageous according to the invention for processing thermoplastic plastics material, that the splitting valve exposes a mouth slit or gap of predeterminable magnitude, for instance less than 0.2 millimeters, also in the basic position of the needle core maintained by the spring means. If however the device is to be used for injection molding of objects from thermosetting plastics-or elastomeric plastics material containing cavities and if herein a head or dish of the nozzle core is to form a splitting valve with the mouth end of the hollow needle, then it is of considerable significance that according to the invention a mouth gap or slit of size zero be preset or adjusted at the splitting valve in the basic position of the needle core held or prestressed by the spring means. It is important in this case that penetration of thermosetting plastic or elastomeric plastic materials into the mouth gap of the splitting valve is always prevented, if hereby no additional pressurized material is introduced into the mold hollow space or the cavity of the mold or into the plastics melt contained therein.

The processing of thermosetting plastics and elastomeric plastics could not be accomplished with the previously known injection molding devices for objects from plastics material containing cavities, because there one operates according to the principle of hot mold/cold melt and the thereby resulting viscosity change of the thermosetting plastics or elastomeric plastics melt entails an undesirable penetration into the mouth aperture of the splitting valve, provided and as long as no media pressure counteracts the penetration of said melt at said mouth aperture. This disadvantage can however be prevented in the invention, because the mouth gap of the splitting valve is automatically reduced to the value zero by the spring means, if and as long as the externally controlled power drive is not actuated.

The removal of contaminants from the mouth slit or gap of the splitting valve of the hollow needle is already facilitated by the invention, in that the externally controlled power drive enables opening of the mouth gap by a relatively large amount, which permits the penetration of suitable cleaning means.

As this has already been mentioned above, the pressurized medium itself, thus a gas, air or also liquid, can be used for displacing the needle core of the hollow needle counter to the force of the spring means, instead of an externally controlled power drive. This is also the case if one is engaged in removing contaminants from the mouth slit or gap at the splitting valve of the hollow needle.

If however the needle core is fixed with its rear end in a mounting supported against the rear end of the hollow needle in a device as previously specified, then a particularly expedient refinement feature of the invention consists in that the needle core is detachably coupled with the mounting proceeding from the mouth end of the hollow needle and passing through same. Herein it was seen to be particularly advantageous, if the coupling is formed by an external threaded portion at the rear end of the needle and an internal threaded portion in the mounting and this coupling can be actuated by applying a tool into a diametrical slot or an internal hexagon, located at the end side of the head or the dish of the needle core.

A twist type connection or a bayonet lock can also be provided by way of coupling means between the rear end of the needle core and the mounting. Finally it would however also be conceivable to provide clamping members with clamping faces matching each other as a coupling means between the rear end of the needle core and the mounting.

Since it is often desirable or even necessary to exert a so-called dwell pressure upon the plastics melt by means of the additional work medium inside of the mold hollow space or cavity, in order to assure a flawless ejection of the moldings concerned, there exist also the necessity of providing a pressure relief for the cavity in the molding after sufficient hardening of the plastics material has occurred, accompanied by extensive recovery of the working medium. Therefore an additional construction type for an inventive device for injection molding of objects from plastics material containing a cavity provides, that the needle core be also configured to be hollow throughout or tubularly shaped, that the needle core be equipped with an additional valve at its end projecting beyond the splitting valve, that the end of the passage in the needle core be blocked by the additional valve toward the hollow space or the cavity with the splitting valve open by the medium present in the passage in the needle core, and that a force or energy accumulator engages at the additional valve, which holds it in the closing sense by prestress in addition to the medium available under pressure in the needle core, which however can be overcome in the opening sense of the additional valve and the passage in the needle core away from the mold hollow space or cavity by the pressurized medium contained in said cavity after pressure relief of the medium present in the needle core has occurred.

The spring means continuously engaging at the needle core in the closing sense of the mouth aperture of the splitting valve are providing in such a way in this constructional type of an injection molding device for objects from plastics material containing cavities, that the needle core is displaceable to a limited extent in the opening sense due to the pressurized medium acting on said needle core counter to the spring means, in order to then inject this medium into the mold hollow space or cavity and/or into the plastics melt placed previously therein.

Then the advantage is herein established, that the splitting valve between the hollow needle and the needle core as well as the additional valve in the passage of the needle core are respectively alternately opened and closed, so that different flow paths in the closest proximity are available for the pressure buildup in the cavity and the pressure relief out of the cavity, which favor an optimum fabrication of the moldings in the molds.

A refinement of the invention has particularly proved itself, which is characterized by the additional valve being configured as a ball valve located at the free end of the needle core, that the force accumulator consists of a spring provided at the rear end of the needle core, being in particular a tension spring, and that a pin received with radial clearance in the passage of the needle core forms the adjustment connection of the force accumulator to the ball valve.

The ball of the ball valve is essentially inserted loosely into the passage of the needle core and is limited there in its' mobility towards the end of the needle core extending beyond the splitting valve by the narrowed valve seat coming into effective connection with said ball. The limitation of the mobility of the ball in the rearward direction or in the direction away from the additional valve is obtained by a pin subjected continuously to the action of the force accumulator. The ball of the ball valve is actuated in direction from the passage of the needle core into the blocking position and in direction from the mold cavity or the hollow space into the open position solely by the effect of the pressurized medium. The pin affected by the force accumulator provides merely support functions for the ball of the ball valve, so that said ball does not pass in an undesirable manner into the open position already during pressure relief of the medium present in the passage of the needle core.

A method for operating a device for injection molding of objects from plastics material containing cavities is also a subject of the invention, where on the one hand the plastics melt is supplied through a nozzle into the mold hollow space or the cavity of the mold, while an additional pressurized medium, as for instance, air, gas, or also liquid, is supplied to the plastics melt through a hollow needle at a point differing from the nozzle. Herein this measure is characterized by the additional medium is, to begin with, directed under pressure merely against the splitting valve held in its closed position under prestress, which splitting valve, during and/or after the injection of thermosetting plastics material or the elastomeric plastics material into the mold hollow space or cavity, is opened by external control against the prestress into the mold hollow space or the cavity; this in order to introduce a pressurized medium into the thermosetting plastics or elastomeric plastics material, and that then, after the a pre-determined effective time period, the additional medium is relieved of pressure as well as herein being again conducted away from the molding through the splitting valve opened exclusively by external control.

Objects from thermo setting plastics or elastomeric plastics material with enclosed cavities can be produced by means of this operational method of an inventive injection molding device, without any functional impairment of the hollow needle systems occurring, which at all cause the feed and the removal of the media enabling the formation of the cavity.

The subject in the invention is explained in detail in the following using the embodiment examples shown in the drawing. It is shown on.

Figure 1:
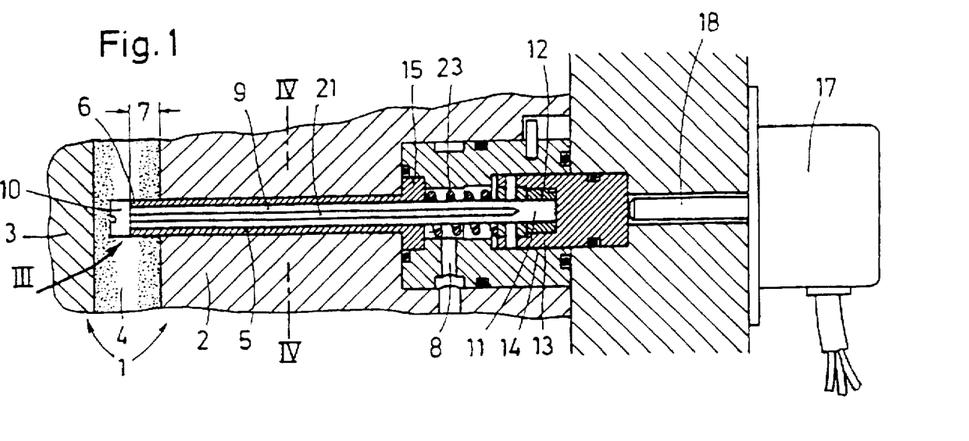
FIG. 1: A partial region of a device for injection molding of objects from plastics material containing cavities in longitudinal section, with a hollow needle comprising a splitting valve for feeding an additional pressurized medium into the mold hollow space or cavity of the mold with an externally controlled power drive for actuating the needle core.
Figure 2:
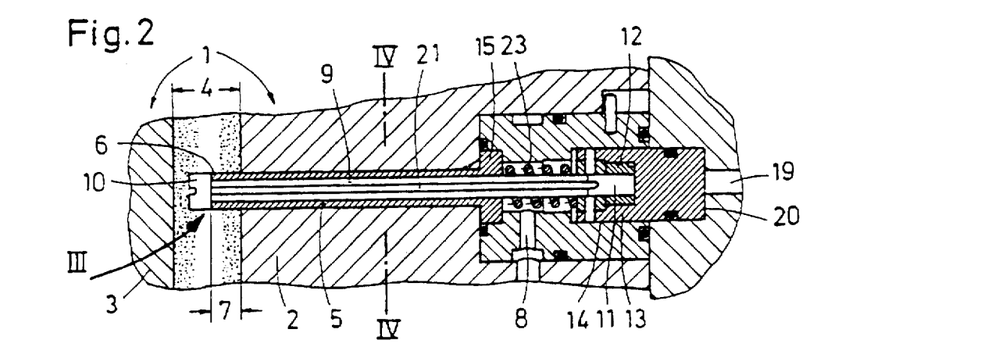
FIG. 2: A sectional view similar to FIG. 1 through a partial region of the device for injection molding objects from plastics material containing cavities, where the externally controlled power drive for actuating the needle core in the hollow needle is designed in a different manner.

FIGS. 1 and 2 of the drawings show respectively one mold 1 for injection molding of objects from plastics material containing cavities comprising two mold halves 2 and 3, which together enclose a mold cavity 4.

Plasticized plastics melt can be injected into the mold cavity 4 of the mold 1 through a nozzle not shown here. At a point different from the nozzle not shown here an additional pressurized medium, for instance air, gas or also liquid, can be fed into the mold cavity 4 through a hollow needle 5.

In the example shown, the hollow needle 5 is stationarily inserted into the mold half 2 of the mold 1, wherein it projects with its discharge or mouth end 6 by a considerable amount into the mold cavity 4. The additional pressurized medium can be fed to the hollow needle 5 through a junction channel 8 in the mold half 2. A needle core 9 is disposed inside of the hollow needle, which core carries an enlarged head or dish 10 located upstream of the discharge end 6 of the hollow needle 5, which has an external diameter corresponding at least approximately to the external diameter of the hollow needle 5. The needle core 9 has a threaded portion 11 at the end facing away from the head or dish 10, which is threaded into a nut piece 12, which sits again nonrotatably and axially nondisplaceably in a block member 13, which is again received in a bush 14 of the mold half 2 so as to be displaceable to a limited extent however nonrotatable.

Figure 3:
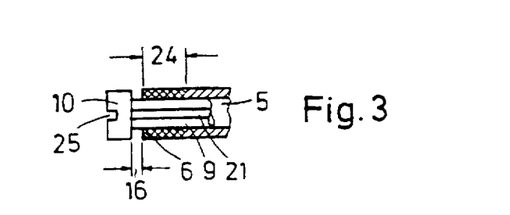
FIG. 3: Shows at larger scale, the partial region of the hollow needle and needle core in another functional position characterized by III in FIGS. 1 and 2 respectively, while the FIGS. 4,5,6, and 7: show various sections respectively along the line IV—IV in FIGS. 1 and 2 through the channel of the hollow needle and the needle core contained in same, at a larger scale.
Figure 4:
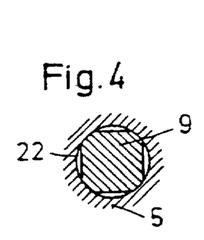

A compression spring 23 is located co-axially to the needle core 9 between the end face of the block piece or member 13 facing the needle core 9 and an enlargement 15 of the hollow needle 5 and is herein prestressed in such a manner, that the needle core 9 comes to rest with its head or dish 10 tightly against the discharge or mouth end 6 of the hollow needle 5, thus completely closing said discharge end 6. By displacing the needle core 9 counter to the restoring action of the spring 23, the head or dish 10 of the needle core 9 can be lifted off the discharge end 6 of the hollow needle 5 and can expose together with said discharge end 6 a discharge aperture in form of a radially oriented splitting valve 16 (FIG. 3); said splitting valve 16 faces the mold cavity 4 and can be varied in its admission cross-section by changing the spacing of the head or dish from the discharge end 6 of the hollow needle 5. The largest opening width of the splitting valve 16 is herein defined by the maximum displacement travel of the block or piston piece 13 within the bush 14, meaning when the left end face of the block member 13 impacts against the left end face of the bushing 14, the maximum opening width of the splitting valve 6 is attained.

Since the compression spring 23 tends by means of the blocking or piston piece 13 and the needle core 9 to place its head or dish 10 of the needle core always tightly against the discharge end 6 of the hollow needle 5 and with this tends to actuate the splitting valve 16 in closing direction, an externally controlled power drive is provided to actuate said splitting valve 16 in the opening sense, which power drive consists of an electromagnet 17 in the embodiment example shown in FIG. 1, which magnet can act upon the blocking member 13 by means of a tappet 18. However, an adjusting motor actuating a spindle can also be utilized by way of a power drive, which can then move the needle core 9 in the opening or closing sense.

The power drive is formed by a piston-cylinder unit in the embodiment example in FIG. 2, where the blocking piece forms the piston 13 and the bushing 14 the cylinder, wherein pressure means can be applied through the channel 19 to the end 20 of the piston, in order to displace the needle core 9 against the action of the compression spring 23, thus opening the splitting valve 16.

A longitudinal groove or a diametrical slot 21 extends nearly across the entire length of the needle core, through which the pressurized medium can arrive from the junction channel 8 up to the rear face of the head or dish 10 of the needle core 9. Only when the discharge slit or gap of a splitting valve 16 is open there between the discharge end of the hollow needle 5 and the head or dish 10 of the needle core 9, can the pressurized medium reach the mold cavity 4 of the mold 1. It is important to design the splitting valve 16 in such a way that it indeed enables to feed the pressurized medium into the mold cavity 4, which, however, prevents said splitting valve 16 from loading up with plastics melt or completely chogging same.

It is also important that the needle core 9 can be adjusted in such a way by its threaded portion 11 in the nut piece 12, that with the sole application of the pre-loading effect of the compressed spring 23 no discharge gap of the splitting valve 16 is open in the right hand end position of the blocking piece or piston 13; thus a dimension 0 exists between the discharge end 6 of the hollow needle 5 and the rear face of the head or the dish 10, or, however, that only a gap or slit of less than 0.2 millimeters, preferably less than 0.1 millimeter, can be attained for the discharge gap 16. Only when the piston or the block piece has been brought into its left hand end position by the power drive 17, 18, 19, 20 counter to the force effect of the compression spring 23, a larger discharge gap of the splitting valve 16 is to become adjustable, which permits also large quantities of the pressurized medium to pass within unit time.

Figure 5:
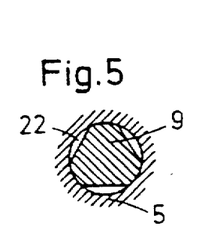
Figure 6:
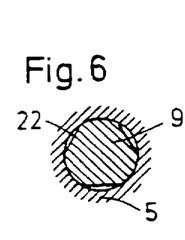
Figure 7:
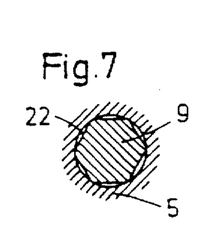

It is also possible, deviating from the embodiment example shown in FIGS. 1 and 2 of the drawing, to design the cross-section of the needle core 9 inside of the hollow needle 5 in such a way nearly across its' entire length, as this can be seen in FIGS. 4 through 7 of the drawing. One or several circumferential flattenings 22 can namely be provided on the needle core 9 instead of longitudinal grooves or diametrical slots 21. Herein four circumferential flattenings 22 uniformly distributed in circumferential direction are provided according to FIG. 4. In FIGS. 5 and 6 respectively three circumferential flattenings 22 are provided in circumferential direction, while in FIG. 7 eight circumferential flattenings 22 are provided.

It is important in all cases, that not only the size of the discharge gap of the splitting valve 6 can be adjusted in a simple manner if need be when the power drive 17, 18 or 19, 20 is not operating. Rather, it is also of considerable importance, that the discharge end 6 of the hollow needle 5 can be completely exposed for cleaning purposes from the front when the mold is open, thus from the open mold cavity 4. Therefore, the needle core 9 is provided with tool application means 23 or a diametrical slot or an internal hexagon at the end face of its' head or dish 10. This enables this tool engagement means to bring the threaded portion 11 of the needle core 9 into a stiffly rotatable engagement with the internal threads of the nut piece 12 and to provide in this way a secure coupling between the needle core 9 and the blocking piece 13. By means of a tool, for instance, a screwdriver or a hexagonal internal socket, the needle core 9 can, however, be detached from the nut piece 12 in the blocking piece 13 and subsequently the needle core 9 can be axially pulled out of the hollow needle 5 towards the front. Now plastic residues clinging in the area of the splitting valve 16 can be easily removed and the splitting valve 16 located between the hollow needle 5 and the needle core 9 can be thoroughly cleaned.

It should additionally be mentioned here, that in some instances it could also be expedient to fabricate a specific, relatively short longitudinal region 24 of the hollow needle 5, this being indeed the longitudinal region 24 which follows directly upon the discharge end 6, not from solid material, rather from sintered metal, which has an air or gas-permeable structure.

Such a hollow needle 5 can be utilized in a particularly advantageous manner, if objects from thermosetting plastics material or elastomeric plastics material containing cavities are to be fabricated in the mold cavity 4 of the mold 1 by injection molding. In this case, the splitting valve 16 between the hollow needle 5 and the head or dish 10 of the needle core 9 need only be opened for feeding large quantities of pressurized medium, while small feed quantities can be passed easily through the sintered metal portion. Only for the pressure relief of the finished molding, thus after sufficient hardening of the thermosetting plastics or elastomeric plastics forming same, an opening of the splitting valve by means of the externally controlled power drive becomes necessary.

It should be mentioned here that indeed, the device described above can be utilized in a particularly advantageous manner for injection molding of objects containing cavities consisting of thermosetting plastics or elastomeric plastics. They are evidently also suitable and provided for being used for injection molding of objects from thermoplastic material.

It should also be pointed out at this time, that the application of the invention is not limited to devices for injection molding of objects from plastics material containing cavities, where the hollow needle 5 for feeding an additional pressurized medium is installed to be stationary in such a way, that it projects with its front end continuously into the mold hollow space or cavity 4 of a mold 1. It is rather possible to utilize the inventive embodiment measures also where hollow needles for feeding an additional pressurized mediums are required, which are provided to be axially displaceable to a limited extent relative to the mold hollow space or cavity 4 of the mold, thus being displaceable between an advanced working position and a retracted inactive position as this is the case in FIG. 4 of the generic DE-OS 39 36 289.

Finally, it is important process-wise, that the additional medium to be fed into the mold hollow space or cavity 4 of the mold is directed under pressure against the splitting valve 16 held in its closed position by the prestress of the compression spring 23; that, during and/or after the injection of thermo-setting plastics or elastomeric plastics into the hollow space or cavity 4 of the mold 1, the splitting valve 16 is opened into the mold hollow space or cavity 4 by the externally controlled power drive 17, 18, or 19, 20 against the pre-stress of the compression spring 23, in order to introduce the pressurized medium into the thermo-setting plastics or elastomeric plastics, and that then the additional medium is relieved of pressure with a time delay as well as being evacuated from the molding through the splitting valve 16 again opened by the exclusively externally controlled power drive 17, 18 or 19, 20.

This manner of proceeding prevents the undesirable clogging of the hollow needle by thermo-setting plastics or elastomeric plastics and enables thus the injection molding of objects from these materials containing cavities.

It is important for the working mode of the injection molding device and indeed mainly for that in FIG. 2, that first of all, the thermoplastic plastics melt be injected at a specific point in time through the nozzle into the mold hollow space or cavity 4 of the mold 1 and thereupon or also in a time overlapping manner the additional pressurized medium is fed into this plastics melt through the hollow needle 5. To begin with the splitting valve 16 must be opened, so that this can happen, by causing pressure to be applied to the piston end 20 through the channel 19. As soon as the splitting valve opens, the pressurized additional medium, for instance air, gas or liquid, available through the junction channel 8 is fed into the mold hollow space or cavity 4 of the mold or into the plastics melt contained therein. Thereby the plastics melt (also thermosetting plastics or elastomers) is displaced against the wall surfaces of the mold hollow space or cavity 4 while forming the cavity and is applied by the media pressure with formation of largely equal wall thicknesses against same.

Due to the differing area conditions of the piston end 20 and of the annular shape end face of the blocking piece 13 located opposite said piston, the splitting valve 16 remains open for as long, even at equal pressure of the additional medium present in the junction channel 8 and the working medium present through the channel 19, until the load is removed from said working medium.

The action of the working medium upon the piston 20 remains in force for as long as the additional work medium inside of the mold hollow space or cavity 4 is to exert pressure upon the plastics melt, thus also until a dwell pressure is to be maintained there. Only then there occurs a pressure decay indeed in the junction channel 8 for the additional medium as well as also in the channel 19 for the working medium.

In order to finally assure a pressure unloading of the additional medium from the molding, it is then necessary to once more open the splitting valve by supplying working medium to the piston 20, if the splitting valve had not already been kept open throughout the entire t i me period.

The actuation of the splitting valve 16 in the open and closed sense as well as also the actuating of the passage and the pressure build up for the additional pressurized medium can be performed in such a way as this is optimum for the respective injection process. Thus, it can for instance be made possible, that the pressure of the additional medium is maintained and utilized as a dwell pressure, wherein then one has to operate for instance with a diminishing pressure profile.

Although it is preferred to inject the pressurized medium, as for instance here air, gas or also liquid, at another point than the plastics melt into the mold 1, this is not an absolute necessity in every case. It is also conceivable, in case of a rheologically flawless design of an injection nozzle, that the feeding of the additional pressurized medium can also occur directly through this injection nozzle, thus at the same point where the plastics melt is also introduced or supplied.

An essential characteristic of the device described above for injection molding of objects from plastics material containing cavities and is in every case, that especially for the processing of thermosetting plastics and elastomeric plastics, a very narrow slit or gap for the gas entry aperture is set up at the splitting valve 16. This gap must be narrow because through it the introduction of the pressurized medium into the region of the melt must occur.

Preferably, the pressurized medium is supplied at another point than the plastics material directly into the melt, meaning into the hot mold. The same aspects concerning the adjustment of a very narrow gap are, however, important also if the feeding of the pressurized medium is occurring directly through the machine nozzle.

An essential design criterion is in any case, that the splitting valve has a gap, which is very small without application of pressure, in order to prevent an entry of mass and which can be opened to a greater extent for feeding the pressurized additional medium, either due to application of pressure itself or by external control. In case of external control there results the special advantage, that the gap of the splitting valve can be opened in a targeted manner also for the purpose of pressure relief.

If the thermosetting plastics or elastomeric plastics melt is introduced into the cavity or the mold hollow space 4 of the mold 1, then it is also important that a pressure build-up is formed in the mold and with this a swelling-like flow filling the cavity or the mold hollow space 4 is achieved. If, on the contrary, filling of the mold hollow space or cavity 4 occurs by means of a blocking/shearing flow, then the pressurized medium escapes in an undesirable manner to the outside already during the filling process due to the insufficiently compacted mass and therefore the desired pressure build up inside of the molding to be formed cannot be achieved.

In particular, in the fabrication of thick walled moldings and when processing plastics masses which do not tend towards a swelling-flow behavior, it is therefore advantageous, to build up a pressure in the mold 1 prior to injecting the plastics melt, and this has been customary for a long time also in thermoplastic plastic foam injection molding, and indeed, in particular, in the injection mold variant with gas counter-pressure. By building up gas counter pressure, which preferably is less than 100 bar, it can be proved when processing thermosetting or elastomeric plastics, that the flow front breaks apart and gas breakout to the outside occurs.

The application of gas counter pressure prior to the injection of plastics melt into the mold is advantageous even if this mold comprises several cavities or mold hollow spaces. It was also seen, that herein a balanced, uniform filling of all existing cavities is attained.

In particular, if thick-walled thermosetting plastics moldings are injected without counter pressure into several cavities, then fluctuations of the filling weight of the individual cavities can occur at the partial filling necessary for the later feed of the pressurized medium. These filling weight fluctuations are herein substantiated by the characteristic of the molding masses being used. By building up a counter pressure acting simultaneously in all cavities or mold hollow spaces, a uniform partial filling of the individual cavities or mold hollow spaces is on the contrary achieved and thus optimum pre-conditions also for fabrication of moldings from thermosetting plastics and elastomeric plastics are created, if these are fabricated with targeted cavities in multiple molds.

It is also possible to build up a targeted counter pressure in the mold by utilizing molds with so-called dip type edges. In such molds, to begin with a core is moved into the cavity or into the mold hollow space, while the plastics melt is being injected. The additional pressurized medium reaches herein the cavity or the mold hollow space either through the machine nozzle itself or however, at another point through a hollow needle. During the ensuing media feed, the mold core is pulled back and because of this the possibility of cavity forming inside of the plastics melt is created. Upon further backward movement of the mold core, the complete cavity is formed in the molding being created. In such a mold operating with so-called dip type edges the mobile mold core has mainly the task of building up the counterpressure in the cavity or the mold hollow space in the course of processing thermosetting plastics and elastomeric plastics.

Except when processing thermosetting plastics-and elastomeric plastics, as for instance, rubber or unvulcanized rubber, the devices with the construction and the mode of operation described above can be utilized also for processing of all hardenable plastics materials.

If the pressurized medium, which is injected into the cavity or the mold hollow space, is preheated, for instance to a temperature similar to the temperature of the mold, thus being of the order of 160–180 degrees centigrade, then a distinctly shorter hardening period for thermosetting plastics material can be obtained. This advantage results from the heat transfer to the plastics material occurring not only externally through the heated mold, rather also from the inside by the preheated pressurized medium. The reaction time periods and thus the hardening periods of the moldings produced in this way can be greatly shortened compared to those cases, where the medium in question is only fed at room temperature.

The heating of the medium can, for instance, occur in accordance of the principle of heat exchange. However, electrical heating elements or pipes of sufficient length heated by radiation can also be utilized for heating said medium.

Instead of molds with dip type edges, molds with embossed cores, molds with side slides, molds with slides in the mold or with parts of the tool, which can be displaced can also be used.

Molds with dip type cores or dip type edges can be used with or without counterpressure, or where the pressure is produced solely by the mold or also additionally by media counterpressure.

Figure 8:
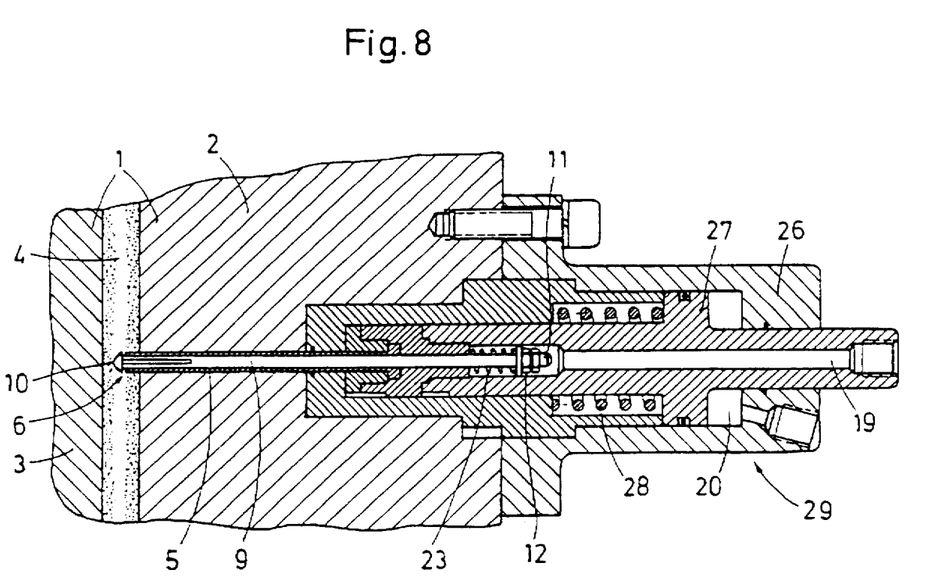
FIG. 8: A section through a device for injection molding of objects from plastics material containing cavities which operates with a hollow needle disposed to be axially displaceable towards the mold hollow space or cavity of the mold.

FIG. 8 shows a device for injection molding of objects from plastic material containing cavities, which differ from those in FIG. 1 and 2 by comprising a hollow needle 5 disposed so as to be axially displaceable towards the mold hollow space or cavity 4 of the mold 1. This device operates with an additional adjustment or actuation drive 22 used for the above purpose. This drive engages at the hollow needle 5 by means of a piston 27 displaceable by pressure application in a cylinder 26 and it can temporarily displace said hollow needle 5 into the mold cavity 4 against the action of a restoring spring 28.

A pressurized medium can be used for acting upon the piston 27, which medium is also fed into the mold cavity 4 through the hollow needle 5.

Naturally the possibility also exists here to have another externally controlled medium act upon the piston 27. The mode of operation of the hollow needle 5 and the needle core 9 is in any case identical with that in the embodiment examples shown in FIGS. 1–3.

Figure 9:
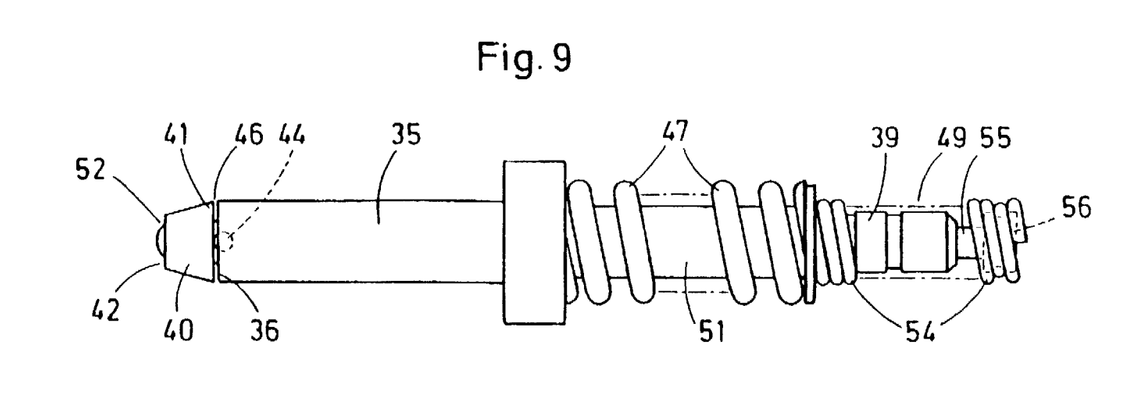
FIG. 9: Represents a side view of an additional constructional form for a device for injection molding of objects containing a cavity, while the FIG. 10: Presents the corresponding device in longitudinal section, and the FIGS. 10a,10b, and 10c: Contain various embodiment feasibilities of the device in FIG. 10 at a larger scale.
Figure 10:
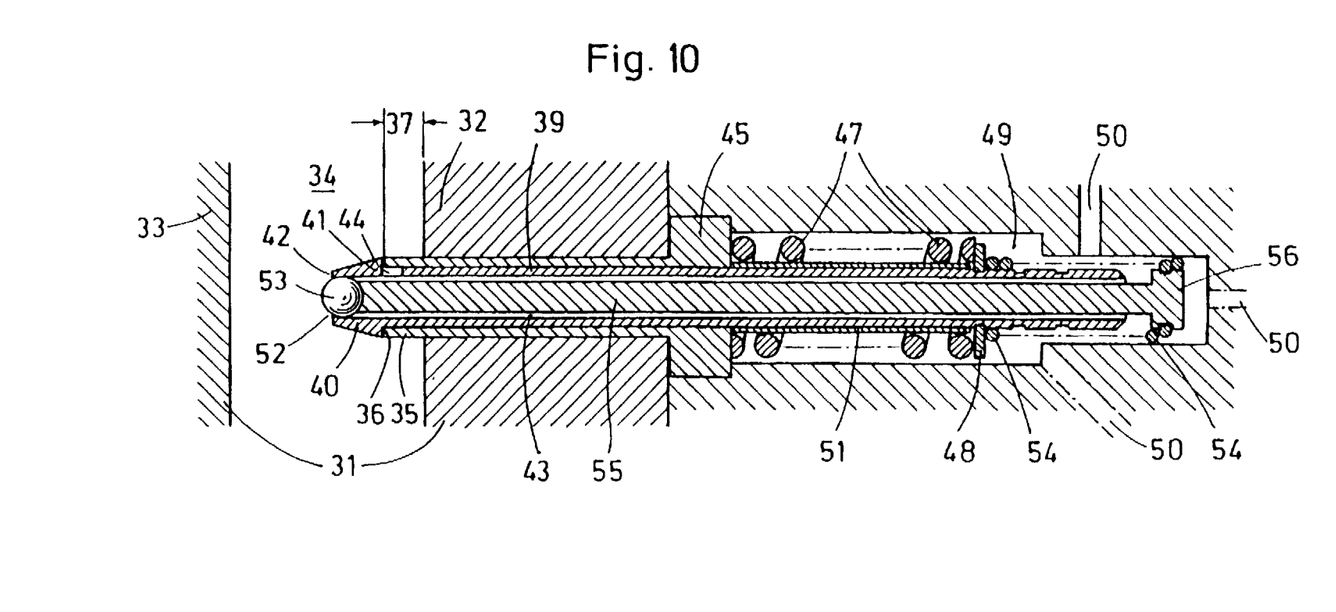

In the device for injection molding of objects from plastics material containing cavities shown in FIGS. 9 and 10, the mold 31 consists of the two mold halves 32 and 33, which enclose the mold hollow space or the cavity 34 between themselves. The hollow needle 35 projects by a dimension 37 with its mouth discharge end 36 into the cavity 34 or for instance through the half 32; the dimension 34 is for instance sized so as to be at least equal to the edge thickness of the finish-molded object from plastics material.

A needle core 39 is as disposed within the hollow needle 35, which carries a head 40 located upstream of the discharge end 36 of the hollow needle 35. Herein this head 40 can be shaped truncated cone-like; however, it can also be given any other suitable shape. It has an annular shoulder 41 at a side facing the mouth-discharge-end 36 of the hollow needle 35, which by way of a sealing stop can come to rest against the mouth end 36 of the hollow needle 35. The largest diameter of the truncated cone shaped head 40 is matched in the region of the annular shoulder 41 to the external diameter of the hollow needle 35, while the end 42 of the head 40 facing away from the mouth end 36 has the smaller diameter.

The needle core 39 is configured across its entire length, thus also in the region of its head 40 so as to be continuously hollow or tubularly shaped. It has thus a passage 43 as this can be distinctly seen in FIG. 10. The needle core 39 is either provided with at least one aperture 44 directly behind the annular shoulder 41 of the head 40, which aperture discharges into the passage 43; or a slit or gap leading in axial direction up to and into a cavity 49 is present between the external circumference of the needle core 39 and the internal circumference of the hollow needle 35, which slit can be configured similarly as this is shown in FIGS. 1–7. If at least one aperture 44 discharging into the passage 43 is used, said aperture can be oriented radially to the longitudinal axis of the needle core 39; however, it can also be given an inclined or oblique position thereto. It is important in every case, that the aperture 44 or the slit be blocked towards the outside by the hollow needle 35, if the needle core 39 rests with the annular shoulder 41 of its head 40 tightly at the discharge end 36 of the hollow needle 35 as is shown in FIG. 10 of the drawing. If, however, the needle core 39 within the hollow needle 35 is displaced from the position in FIG. 10 into the position in FIG. 9, thus towards the left hand side, then a radial splitting valve 46 opens between the annular shoulder 41 at the head 40 of the needle core 39 and the discharge end 36 of the hollow needle 35, as this can be seen in FIG. 9. The splitting valve 46 can be fed from the passage 43 or the cavity 49 by the pressurized medium through the apertures 44 or the slit at the circumference of the needle core 39, wherein the pressurized medium enters into the mold hollow space or cavity 34 of the mold 31.

The hollow needle 35 abuts by means of an end enlargement 45, preferably with interposition of a seal, axially at the mold half 32, while itself serving as an abutment for the one end of the compression spring 47, which acts with its other end upon a stop washer 48, which is in engagement with the needle core 39 so as to be nondisplaceable axially. The needle core 39 is continuously acted upon therein in such a way by the compression spring 47, that the annular shoulder 41 of its head 40 tends to keep the radial splitting valve, which is formed together with the mouth end 36 of the hollow needle 35, in the closed position.

The stop washer 48 is housed in such a way in a cavity 49, that it can be acted upon by the pressurized medium which is to be fed into the mold hollow space or cavity 34 at its side facing away from the compression spring 47, which medium arrives for instance into the cavity 49 through a channel 50. The pressurized medium acting upon the stop washer 48 can herein overcome the restoring force of the compression spring 47 and shift the stop washer 48 up to a stop sleeve 51 supported against the end enlargement 45, by means of which stop sleeve 51 the opening width of the splitting valve 46 can be precisely defined.

The needle core 39 is provided with the additional valve 52 at its end 42 protruding beyond the splitting valve 46, which valve 52 cooperates with the there located end of the passage 43 in the needle core 39. The additional valve 52 develops herein its effect or action inside of the head 40 of the needle core 39 and works by means of a ball 53 axially displaceable in the area of the discharge end 42 of the passage 43. The closure of the additional valve 52 occurs on the one hand by the effect or action of the pressurized medium exiting from the cavity 49 and present in the passage 43, which medium displaces the ball 53 in the closing sense, meaning towards the left hand side. On the other hand, a tension spring 54 also urges the ball 53 into a closing direction, which tension spring engages at the pin 55 which presses against the ball 53 again in the left direction, pressing same then against the seat at the discharge or mouth end 42 of the passage 43 in a positively locking manner, so that the additional valve 52 now becomes air tight.

The additional valve 52 remains closed under the action of the tension spring 52 and the pin 55 even when a pressure equalization is achieved between the pressurized medium fed through the channel 50 into the cavity 49 and the mold hollow space or cavity 34 of the mold 31. On the other hand, the valve 52 is, however, opened by axial displacement of its ball 53 towards the right hand side, as soon as a pressure of the medium present in the cavity 49 is relieved through the channel 50. In that case, namely, the medium pressure present in the mold hollow space 34 or the cavity of the mold 1 acts upon the ball 53 of the additional valve 52 and shifts same against the effect of the tension spring 54 engaging at the pin 55 to the right hand side. The ball 53 therefore lifts off the seat at the discharge end 42 in the passage 43 of the needle core 39 and consequently exposes the passage 44 for pressure relief of the cavity in the finished plastics object.

It can be seen that pin 55 is received in the passage 43 of the needle core with an axial clearance and that the tension spring 54 engages at a piston-like enlarged end 56 of the pin 55 facing away from the ball 53 of the valve 52, which enlarged end 56 is located externally of the right hand end of the needle core within the cavity 49.

The right hand end of the cavity 49 corresponding with the hollow needle 35 but facing away from same, as is shown in FIG. 10, can have a narrowed cross-section. It can, however, have the same cross-section as said cavity 49.

At least one channel 50 carrying the pressurized medium discharges into the cavity 49. This channel 50 can herein be oriented radially from the side into the cavity 49, as this is indicated by solid lines. However, it can also be directed obliquely or coaxially into the cavity 49, as this is indicated in FIG. 10 respectively by the dash dotted lines.

The valve 52 has, as has already been stated, mainly the task to provide pressure relief from the cavity in the finished plastics part, after the splitting valve 46 has been closed, and hereby to cause the return or recovery of the medium located in this cavity through the passage 43 in the needle core 39 of the device.

The mode of operation of the device for injection molding of objects from plastic material containing cavities explained with the help of FIGS. 9 and 10 is as follows:

Provided no pressurized medium is present in the cavity 49 through the channel 50, the radial splitting valve 46 closed by the compression spring 46 is acting between the needle core 39 and the hollow needle 35; meaning its valve gap between the annular shoulder 41 of the head 40 at the needle core 39 and the discharge end 36 of the hollow needle 35 has a gap with a dimension zero. The splitting valve 46 or its valve gap can therefore not be fouled or blocked in an undesirable manner by plastics melt.

Upon entry of the pressurized medium into the channel 50 and the cavity 49, the needle core 39 of the hollow needle 35 is moved towards the left or towards the front. This indeed by a dimension limited by the sleeve 51 through the pressure being built up and acting against the stop washer 48 while overcoming the restoring force of the compression spring 47. Thus, the splitting valve 46 opens, a radial valve slit of predetermined magnitude is formed, through which the pressurized medium can enter into the melt located in the mold hollow space or the cavity 34. The pressure of the medium present in the cavity 49 acts however also upon the ball 53 of the additional valve 52 through the passage 43 and the needle core 39 and this indeed in such a way, that the ball 53 closes the passage 43 at the end of the needle core 39 extending beyond the splitting valve 46 in a gastight manner.

The medium is held at the respectively predetermined or predeterminable pressure through the channel 50 and the cavity 49 for the duration of the retention of a dwelling pressure in the mold hollow space or the cavity 34 of the mold 31. If however a pressure relief occurs in the channel 50 and consequently in the cavity 49, then the splitting valve 46 immediately closes under the action of the restoring force of the compression spring 47, meaning its radial valve gap diminishes to the dimension zero. Due to the pressure relief of the medium in the cavity 49 it's action or effect upon the ball of 53 of the additional valve 52 is however terminated at the same time. Then the medium pressure still present out of the mold hollow space or cavity 34 of the mold 31 is applied to the ball 53, which is consequently lifted off the seat at the discharge end 42 of the passage 43, meaning in the opening sense towards the right hand side. The lift-off of the ball 53 from the seat of the additional valve 52 occurs with axial displacement of the pin 55 against the action of the tension spring 54 towards the right hand side. Thereby the media pressure prevailing in the mold hollow space or the cavity 34 of the mold 31 can slowly decay, which leads to the recovery of the medium through the passage 43 in the needle core 39.

In the type of construction shown in FIGS. 9 and 10 the spring means 47 located between the hollow needle 35 and the needle core 39 can also affect the discharge aperture of the splitting valve 46 in the closing sense in the same way as in the types of construction of injection molding devices described in FIGS. I through 8; all this while the needle core can be displaced in the opening sense by the pressurized medium in the cavity 49 counter to the spring means. The tension spring 54 further-on effective between the needle core 39 and the pin 55 also tends to maintain the additional valve 52 continuously in the closing state.

As a consequence of the media pressure built up in the cavity 49 through the channel 50, a leftwardly oriented forward movement of the needle core 39 together with the pin 55 disposed coaxially therein is generated counter to the action of the compression spring 47. While the splitting valve 46 opens herein, the additional valve 52 remains at the same time in its closed position. The pressurized medium enters through the splitting valve 46 into the mold hollow space or the cavity 34 of the mold 31 and with this also into the plastics melt contained therein.

After expiration of the medium dwell time respectively effective in the mold hollow space or the cavity 34, the media pressure in the cavity 49 is lowered through the channel 50. As a result of the dropping pressure in the cavity 49 the prestressed compression spring 47 is unloaded and thus closes the splitting valve 46 between the needle core 39 and the hollow needle 35. Thus, the medium present in the mold hollow space or the cavity 34 can therefore no longer escape through the splitting valve 46. However a pressure gradient is established between the mold hollow space or the cavity 34 of the mold 31 and the hollow space 49. The media pressure present in the mold hollow space or the cavity 34 acts upon the ball of 53 of the additional valve 52 and displaces same toward the right hand side with simultaneous displacement of the pin 55 against the action of the tension spring 54. The passage 43 in the hollow needle 39 opens and a pressure is relieved from the mold hollow space or the cavity 49, until the restoring force of the tension spring 54 is in balance with the force exerted in opposite direction by the medium upon the ball 53.

The small residual pressure of the medium still remaining in the mold hollow space or the cavity 34 is completely eliminated during removal of the molding from the mold.

At this time it should be once more explicitly stated, that equipping the needle core 39 with radial apertures 44 in the region of the splitting valve 46 as shown in FIG. 10 is not mandatory. The apertures 44 can then also discharge in an oblique position into the passage 43 of the needle core 39. In accordance with the types of construction in FIGS. 1 through 8, the apertures 44 can however be completely eliminated, if axial passages to the hollow spaces 49 are created between the internal circumference of the hollow needle 35 and the external circumference of the needle core 39, which form a flow path for the pressurized medium towards the splitting valve 46. In that case passage 43 in the needle core 39 serves only for permitting the flow back or pressure relief of the medium from the mold hollow space or cavity 34 of the mold 31 with the additional valve 52 being open.

In conclusion it should be mentioned, that naturally the possibility exists to utilize the stop sleeve 51 located between the hollow needle 35 of the needle core 39 in the construction of the injection molding device shown in FIGS. 9 and 10 also in the injection molding devices shown in FIGS. 1, 2 and 8 of the drawing. In that case this stop sleeve is then installed coaxially to the compression spring 23 and to the needle core 9 downstream of the end enlargement 15 of the hollow needle 5.

When injection molding plastics moldings with cavities formed by introduced media pressure therein, one attempts to fill the mold hollow space or the cavity at the lowest pressure possible with plastics melt, so as to preclude opening the additional valve during this filling process.

If however, higher melt pressures become necessary for filling the mold hollow space or cavity 34, prior to the pressure of the additional medium acting into the mold hollow space or cavity, then the medium pressure is already built up in the cavity 49 of the device during the filling phase with melt according to FIGS. 9 and 10, which indeed holds the additional valve 52 in a secure closed position, which however on the other hand is insufficient for opening the splitting valve 46 counter to the prestressing force of the spring means 47.

The constructional type of injection molding device described and shown in FIGS. 9 and 10 can thus be easily adapted in an expedient manner to all occurring operational circumstances.

Figure 10A:
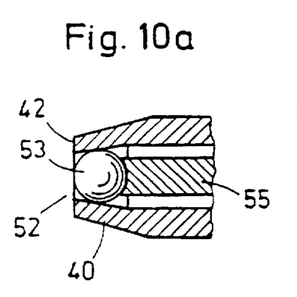
Figure 10B:
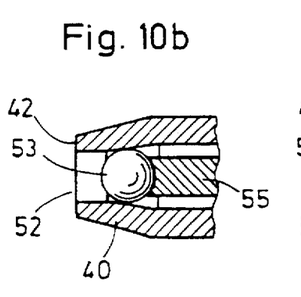
Figure 10C:
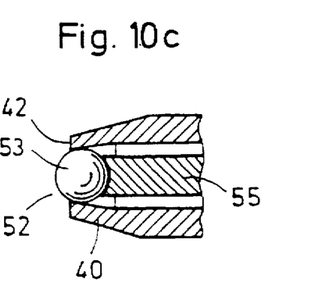

FIGS. 10a to 10c show that the additional valve 52 can be given different embodiments. While in FIG. 10a the cone-shaped seat for the valve ball 53 lies in such a way at the end of the passage 43, that the valve ball 53 terminates flush with the end 42 of the needle core 39 in its blocking or sealing position, it is positioned in FIG. 10b in such a way, that the valve ball 53 in its closing position still has a relatively large spacing from the end 42 of the needle core 39. In FIG. 10c the cone-shaped seat in the passage 43 is shaped in such a way, that the valve ball 53 in its blocking position protrudes beyond the end 42 of the needle core 39.

We claim:

1. A device for injection molding of articles having hollow spaces directly from a low-viscosity plastic material melt, the device comprising:

a mold having a mold cavity for receiving a plastic material melt; means for injecting the plastic material melt into the mold cavity; and means for introducing a pressurized medium into the plastic material melt when the plastic material melt is received in the mold cavity, the introducing means comprising:

a hollow needle extending into the mold cavity at a location spaced from a location at which the plastic material melt is introduced into the mold cavity, the hollow needle having a discharge end defining a discharge aperture through which the pressurized medium is introduced into the plastic material melt;

a needle core axially displaceable in the needle for varying a cross-section of the discharge aperture, the needle core having at an end thereof located in the mold cavity an enlarged head having a diameter exceeding a diameter of the discharge aperture of the needle and defining, together with the discharge end of the needle, the cross-section of the discharge aperture; and a power means for displacing the needle core between a first position in which the discharge aperture is substantially closed by the needle core head, and a position in which the discharge aperture is open;

wherein the needle core includes a discharge passage, and wherein the device further comprises valve means for blocking the discharge passage in an open position of the discharge aperture, and means for retaining the valve means in a blocking position, the valve means being actuated to an open position thereof upon pressure in the mold cavity exceeding a retaining force applied by the retaining means to the valve means.

2. A device according to claim 1, wherein the power means comprises a motor-driven spindle.

3. A device according to claim 1 wherein the power means comprises a diaphragm.

4. A device according to claim 1, wherein the valve means comprises a ball valve located at a discharge end of the needle core, wherein the retaining means comprises a spring provided at the remote end of the needle core, and a pin extending through the needle core and engaging the ball valve.

* * * * *